T. B. DRESCHER.
BIFOCAL OR MULTIFOCAL LENS.
APPLICATION FILED NOV. 25, 1921.
1,414,117. Patented Apr. 25, 1922.
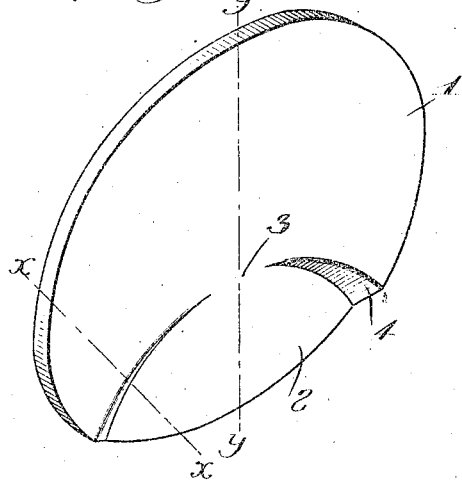
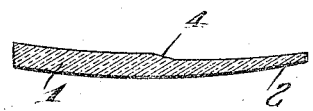 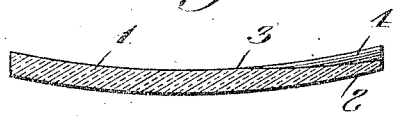
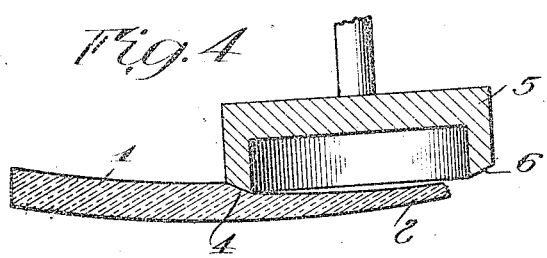
INVENTOR.
Theodore B. Drescher
BY
his ATTORNEY

UNITED STATES PATENT OFFICE.

THEODORE B. DRESCHER, OF ROCHESTER, NEW YORK, ASSIGNOR TO BAUSCH & LOMB OPTICAL COMPANY, OF ROCHESTER, NEW YORK, A CORPORATION OF NEW YORK.

BIFOCAL OR MULTIFOCAL LENS.

1,414,117.      Specification of Letters Patent.     Patented Apr. 25, 1922.

Application filed November 25, 1921. Serial No. 517,477.

*To all whom it may concern:*

Be it known that I, THEODORE B. DRESCHER, of Rochester, in the county of Monroe and State of New York, have invented certain new and useful Improvements in Bifocal or Multifocal Lenses; and I do hereby declare the following to be a full, clear, and exact description of the same, reference being had to the accompanying drawings, forming a part of this specification and to the reference numerals marked thereon.

My present invention relates to bifocal and multifocal ophthalmic lenses and has for its object to provide such a lens that is neat in appearance. Heretofore in bifocal and multifocal lenses and particularly bifocal lenses, the line of division between the near vision area and the far vision area has either been marked by a ledge in which dirt or foreign matter is liable to lodge and thus render the glasses unsightly, or else the two surfaces are merged as in the Connor Patent No. 932,965. The principal objection to lenses of the last mentioned form is the expense of grinding and polishing to produce a line which is practically invisible, and the object of my present invention is to provide a bifocal or multifocal lens which may be economically ground and polished to form the distant and near vision areas, and at the same time avoid the objections to lenses of the character first mentioned which are more cheaply produced but embody a well defined ledge or shoulder.

In the accompanying drawings:

Figure 1 is a perspective view of a lens embodying my improvements;

Figure 2 is a sectional view on the line x—x of Figure 1.

Figure 3 is a sectional view on the line y—y of Figure 1, and

Figure 4 is a sectional view through a lens and the tool for grinding the near vision area.

Similar reference numerals throughout the several views indicate the same parts.

The lens shown is preferably of the monocentric type and embodies the major area for distant vision indicated by 1, and the minor area or reading portion for near vision indicated by 2, both spherically ground and of different dioptrics and having their center at or about the center of the lens where they merge as indicated at 3. Lenses of this character are usually formed by first grinding and polishing the area for distant vision, and subsequently the reading area is ground and polished leaving a ledge formed on the curved line between the two areas. These ledges are of gradually increasing depth or height toward the lower and outer sides of the lens and are objectionable in that they collect dirt and cannot be readily cleansed. According to my invention I grind off and polish these ridges from the level of the major surface to that of the minor surface but upon a spherical curve preferably of the same dioptric as one of the areas, thus producing the surfaces indicated by 4 which are wider at the edges of the lens and by reason of the monocentric character of the lens vanish or merge into the surfaces of both areas before reaching the center. The surfaces thus formed of course vary in width according to the difference in the dioptric curves of the major and minor areas and in the form shown represent perhaps an extreme width, but in practice I find that they do not materially interfere with the vision of the wearer while the lens as a whole is materially improved in appearance over lenses having a sharp ledge.

The surface 4 is spherically ground and is of approximately the same dioptric curve as the distant vision area and the operation of grinding and polishing may be accomplished by the same tools and simultaneously with the grinding of the minor area as shown in Figure 4, the outer edge of the grinding tool 5 employed for grinding this surface being beveled or rounded to produce the proper curve.

The tool for grinding the minor area may be an ordinary solid lap in which event the beveled edge 6 is formed to produce the exact curve required for the intermediate surface 4, but if a ring tool is employed for the purpose and the curve of the reading area is determined by inclining the axis of revolution in the usual manner the curvature of the edge 6 bears a definite relation to the inclination of the axis of the tool to produce the proper curve for the surface 4.

The surface and the edges of the portion 4 are polished by the same tools that are used to polish the reading area in the usual way.

I claim as my invention:

1. An ophthalmic lens consisting of a single crystal and comprising a plurality of fields on the surface of different dioptrics for distant and near vision, the line of joinder between two adjacent fields being formed on a spherical curve.

2. An ophthalmic lens consisting of a single crystal and comprising a plurality of fields on one surface of different dioptrics for distant and near vision, the line of joinder between two adjacent fields being formed on a spherical curve corresponding with that of one of the fields.

3. An ophthalmic lens consisting of a single crystal and comprising a plurality of fields of different dioptrics on one surface having a common center, the line of joinder between two adjacent fields being formed on a spherical curve corresponding with that of one of the fields.

THEODORE B. DRESCHER.